United States Patent [19]

Luyten

[11] 4,446,899
[45] May 8, 1984

[54] DOUBLE-SIDED TENONER

[75] Inventor: Jacobus H. Luyten, Va Steyl, Netherlands

[73] Assignee: Helmes Machinefabriek B.V., Netherlands

[21] Appl. No.: 376,966

[22] Filed: May 11, 1982

[30] Foreign Application Priority Data

May 18, 1981 [NL] Netherlands ............... 8102437

[51] Int. Cl.³ .............................................. B27F 1/10
[52] U.S. Cl. ................................ 144/201; 144/2 R; 144/82; 144/363; 409/170
[58] Field of Search ............... 144/2 R, 134 R, 198, 144/200, 201, 203, 205, 359, 363, 67, 82, 84, 85, 87, 88; 409/170

[56] References Cited

U.S. PATENT DOCUMENTS 2,586,798  2/1952  Eck .
2,794,371  6/1957  Roehm .
4,184,525  1/1980  Helmes ........................ 144/2 R

*Primary Examiner*—W. D. Bray
*Attorney, Agent, or Firm*—Ostrolenk, Faber, Gerb & Soffen

[57] ABSTRACT

A tenoner provided with two driven milling cutters positioned opposite each other on both sides of a traveling carrier for a workpiece. Each cutter is carried in a carriage mounted in a supporting element which comprises a base displaceable on the frame in two mutually perpendicular directions. The carriage is tiltable around two mutually perpendicular axes for setting the location and angular position of a tenon.

These axes intersect each other at an imaginary point coinciding with the root of the tenon, which is i.e. the center of the common attachment plane of tenon and workpiece. The cutters each make a stepwise revolution and a rectilinear reciprocating motion around the root in producing a tenon. Because of this arrangement, the angular setting of the cutter can be quickly adjusted.

20 Claims, 21 Drawing Figures

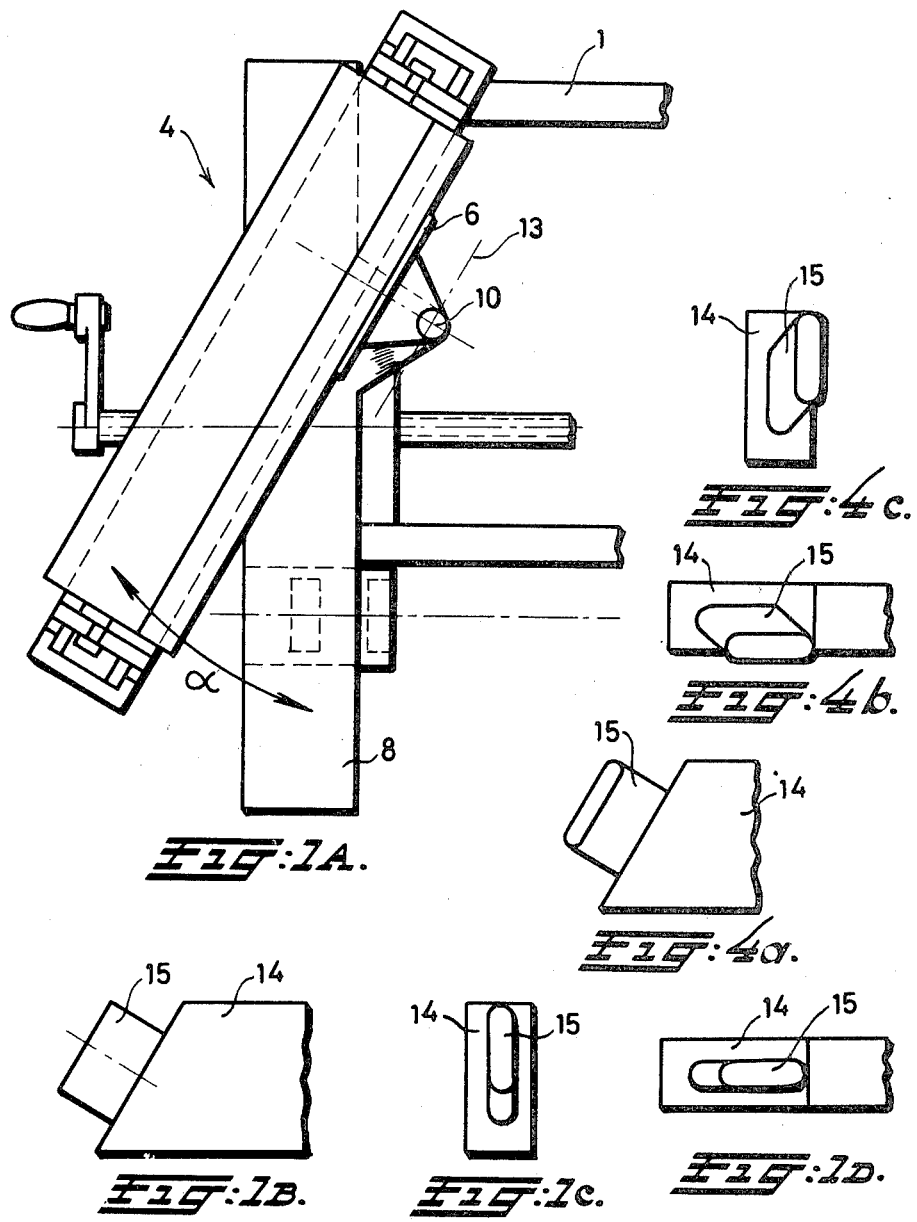

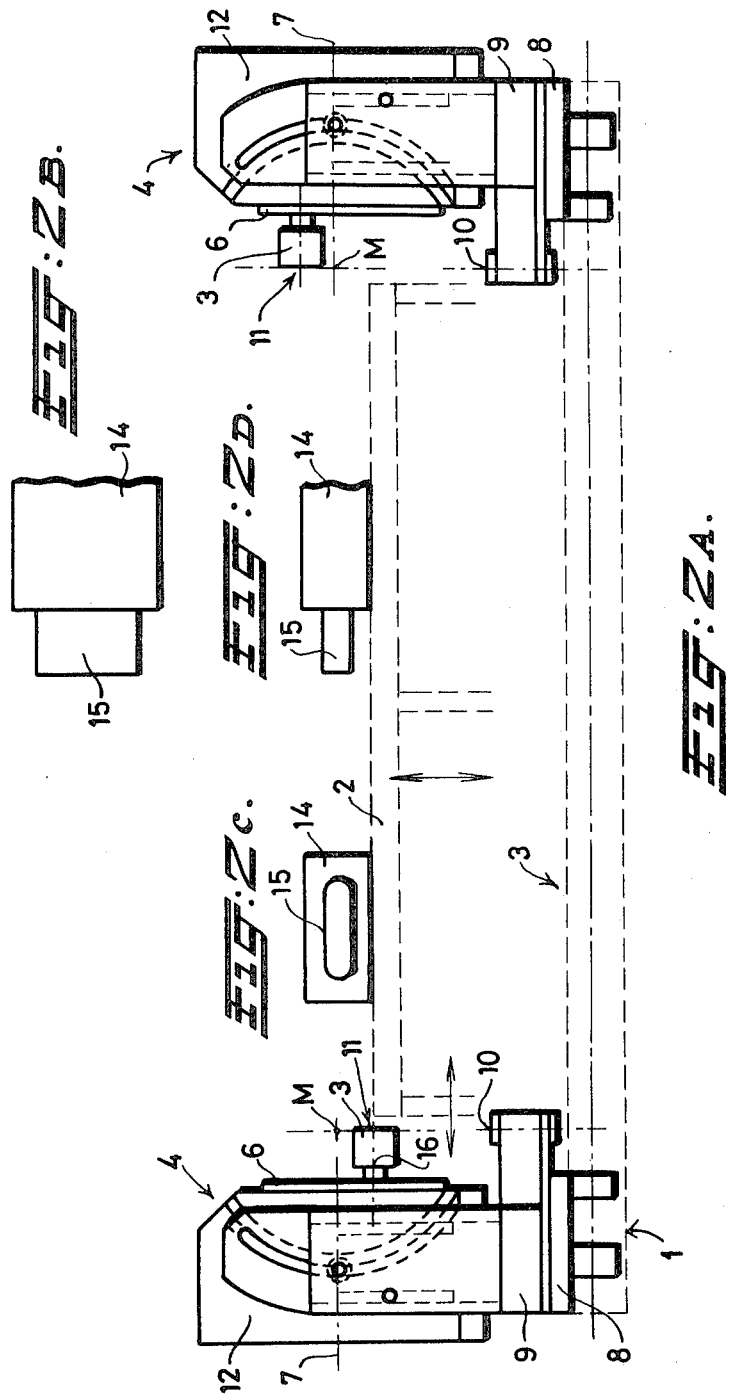

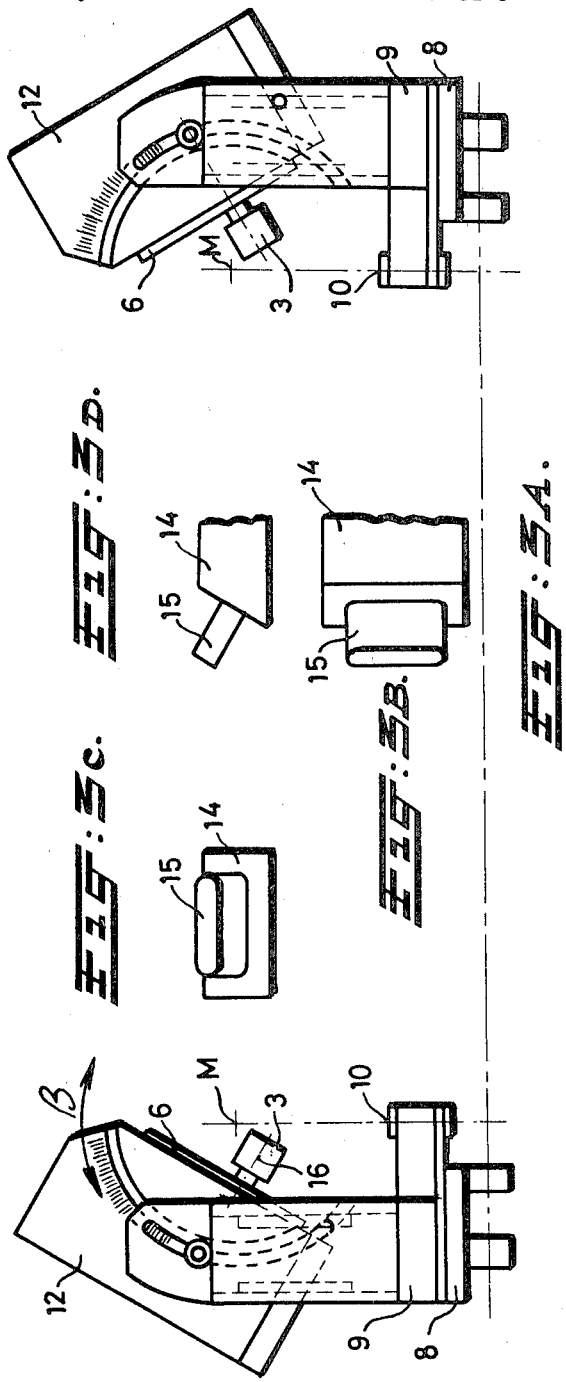

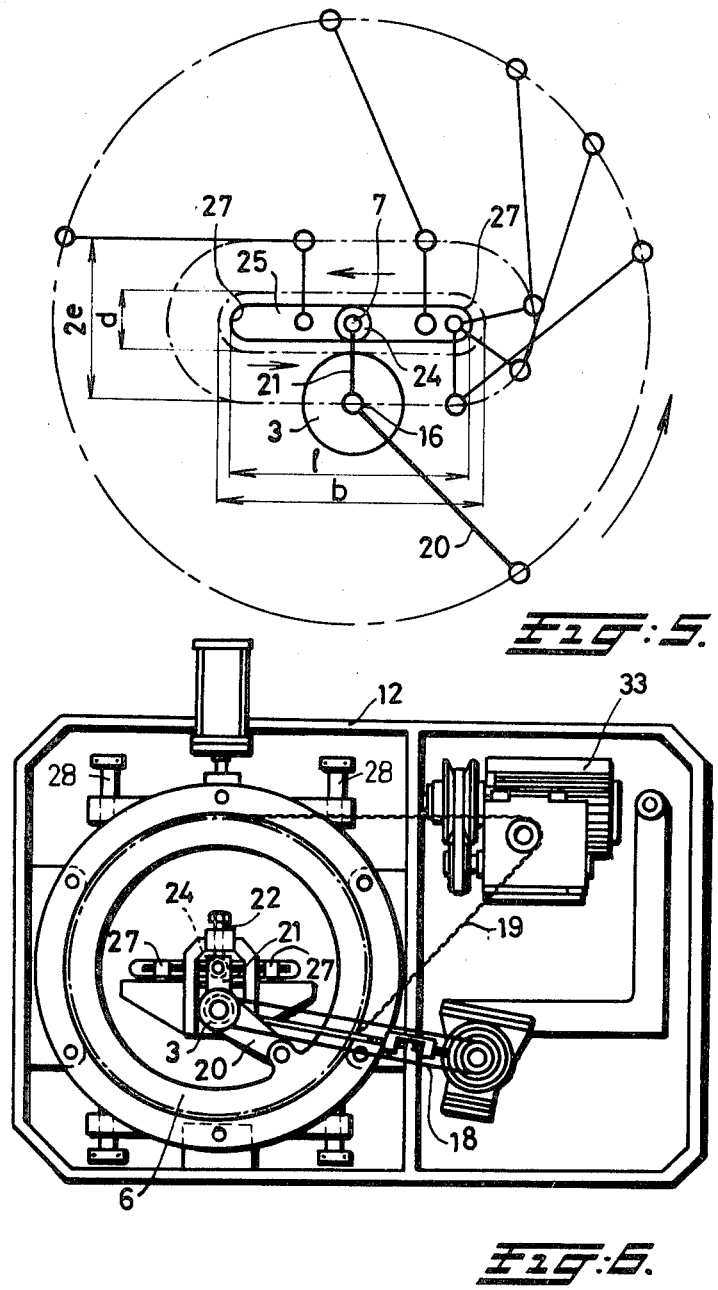

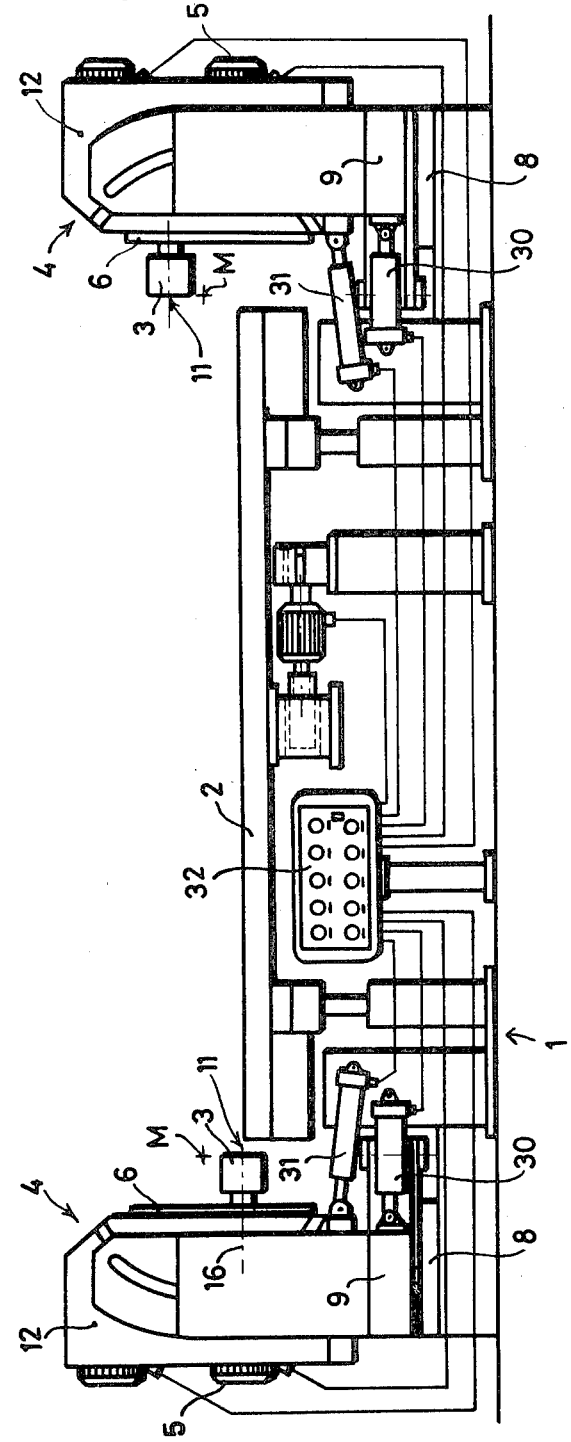

DOUBLE-SIDED TENONER

BACKGROUND OF THE INVENTION

1. Field of the Invention

The present invention relates to a tenoner capable of milling a tenon at both ends of an elongate workpiece, said tenoner comprising a frame with at least one displacable workpiece carrier and at least one adjustable milling cutter with drive, journaled upon a support, with which a stepwise revolving movement of periodically 180° around an axis can be imparted to the cutter.

2. Description of the Prior Art

Such a tenoner is known from Netherlands patent specification No. 104 722 and U.S. Pat. No. 4,184,525 issued Jan. 22, 1980 to Franciscus Jacobus Helmes. These Patents describe a milling cutter which is provided with two drives, one for continuous rotation of the cutter around its own axis and a second drive with which the cutter is periodically revolved through an arc of 180°, so that the tenons produced have rounded sides. The reciprocating movement of the workpiece carrier causes the shaping of the two flat faces of each tenon.

This known state of the art which is still used, works satisfactorily, provided that the tenons to be produced lie in the extension of the longitudinal direction of the workpiece. The end faces of the workpiece will then always be perpendicular to this longitudinal direction.

If, however, it is desired to produce workpieces, the ends of which are not perpendicular to said longitudinal direction and when moreover the tenons to be produced are not at right angles to those oblique ends and, for instance, the tenons at either end are different, a relatively time-consuming and laborious adjustment of the cutter support is necessary. This may require an angular setting in two directions perpendicular to each other. This in turn causes an additional complication, in that an angular setting of the cutter support in one plane requires a subsequent correction in respect of the angular setting already effected in the other plane.

SUMMARY OF THE INVENTION

It is a primary object of the present invention to provide a tenoner with which it is not only possible to produce in a single operation a tenon at both ends of the workpiece (of varying shapes if required), but also in which above all, the adjustment of the machine in accordance with the desired shape of the tenons is considerably simplified.

These objects are achieved according to the invention by mounting two cutters opposite each other in the frame, each in a carriage of a supporting element positioned at one end of the workpiece carrier, and by so mounting each carriage in the supporting element that it is displaceable in two mutually perpendicular directions and tiltable around two mutually perpendicular axes for setting the relative place and angular position of the relevant tenon.

By these means a tenoner is obtained, in which the workpiece carrier always travels along the same path in the frame of the machine and in which each cutter makes both a stepwise revolution and a rectilinear reciprocating motion in producing a tenon. All the adjustments required for the intended tenon are made at the carriage of the cutter. This also makes it possible to machine the two (possibly different) ends of the workpiece at the same time, contrary to the known state of the art.

The invention relates in particular to a tenoner, in which the front face of each milling cutter is set to mill a flat surface, perpendicular to the center of the cutter. A structural embodiment of the principle of the invention as described is obtained in that each supporting element consists of a base slidably supported in the frame, on which base a support is journaled, which is rotatable around a vertical axis, passing through an imaginary point in the extension of the front face of the milling cutter and lying on the line of intersection of the plane through the two axes of revolution on the one hand and the perpendicular plane parallel to and midway between these two axes on the other hand, on which support is mounted the carriage which holds the milling cutter and which can be tilted along a line passing through the said imaginary point.

The aforementioned imaginary point may be considered as the 'root' of each tenon, since this point is located in the center of the plane in which the tenon is joined to the other material of the workpiece. Because the tilting movements of the various parts of the supporting element follow around a line which passes through that point of intersection (the root), one angular setting of the position of the cutter in a first plane no longer has any effect on the angular setting of the same cutter in the second plane perpendicular to the first plane. The tenoner can thus be adjusted fairly quickly to meet the requirements for the production of a new workpiece.

In a convenient embodiment of the tenoner according to the invention there are scale marks between each pair of parts of the supporting element, which parts are adjustable in respect of each other. These scale marks provide a direct indication of the angular position and of the place of each tenon in respect of the workpiece. The operator is thus able to adjust his tenoner easily and quickly to meet the specifications for a new workpiece.

It is also conceivable that for each of the aforementioned possible adjustments a remote-controlled source of power is present, in combination with a control panel provided with adjusting elements and visual indicators, with the aid of which the shape, place and angular position of the tenons on each workpiece can be adjusted and monitored.

The features of the present invention which are believed to be novel are set forth with particularity in the appended claims.

Other objects and many of the attendant advantages will be more readily appreciated as the invention becomes better understood by reference to the following detailed description considered in connection with the accompanying drawings in which like reference symbols designate like parts throughout the figures.

DESCRIPTION OF THE DRAWINGS

FIG. 1a is a plan view of the carriage of a tenoner, in which one of the elements of the carriage has undergone an angular rotation in a horizontal plane;

FIGS. 1b, 1c and 1d are three views of an end of a workpiece with a tenon obtained with the carriage in the position shown in FIG. 1a;

FIG. 2a is a front view of a tenoner, in which the angular setting of the elements of the carriage is such that a conventional tenon is produced on the workpiece.

FIGS. 2b, 2c and 2d are three views of the tenon obtained with the machine of FIG. 2a;

FIG. 3a is a front view of the tenoner, in which the milling cutter has undergone an angular setting in a vertical plane;

FIGS. 3b, 3c and 3d show the tenon thus obtained;

FIGS. 3a, 4b, 4c show a tenon obtained with a milling cutter which has undergone an angular rotation in two planes perpendicular to each other, corresponding to a combination of FIGS. 1a and 3a;

FIG. 5 is a diagram to elucidate the path along which the milling cutter travels;

FIG. 6 is a front view of the carriage with the cover plate removed;

FIG. 10 is a schematic view of an electronically controlled tenoner.

DESCRIPTION OF THE PREFERRED EMBODIMENTS

Figure 7:
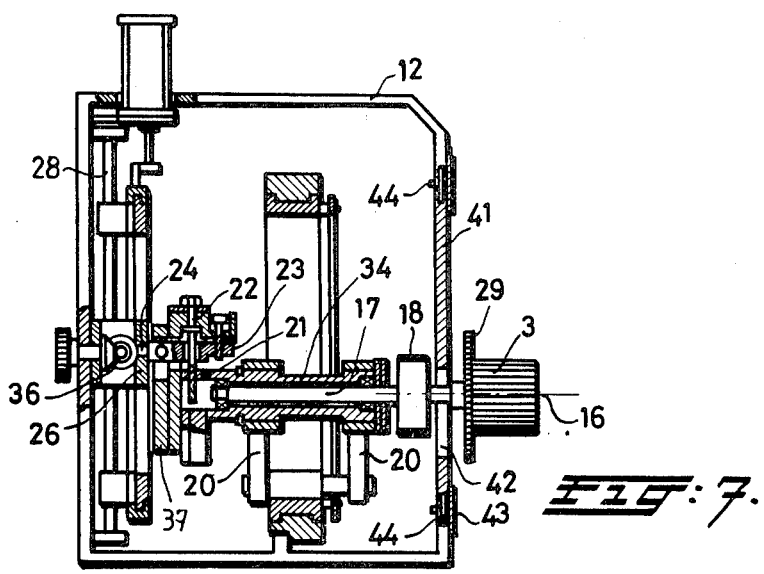
FIG. 7 is a side view of the carriage as represented in FIG. 6.

The description of the embodiment(s) of the tenoner refers only to those elements which are essential to the present invention. The remaining structural details of the tenoner may be designed in accordance with the conventional machines as described in the aforementioned Netherlands patent specification No. 104 722 and U.S. Pat. No. 4,184,525. Referring now to FIGS. 1a and 2a, the tenoner consists of a frame 1 in which there is at least one movable workpiece carrier or slide 2. Two milling cutters 3 (side cutters) are mounted opposite each other in the frame 1, each in a supporting element 4. These elements 4 are mounted on opposite sides of the frame 1, close to one end of the workpiece carrier 2. Each cutter 3 is provided with a drive 5 (see also FIG. 6), the cutter with its support bearing upon an annular disk 6, with which a stepwise revolution of 180° around an axis 7 can be imparted to the cutter for shaping the rounded edges of the tenon. The cutter 3 can also follow a rectilinear path within the disk 6 for the flat faces of the tenon. Each cutter 3 is so mounted in its supporting element 4 as to be movable and tiltable for the adjustment of the relative place and angular position of the specific tenon. (see also FIG. 3a)

Each supporting element 4 comprises a base 8 slidably supported in the frame 1. On this base a support 9 is journaled which can be rotated around a vertical axis 10. The position of the said axis is determined by an imaginary point M (known as the root) lying in the center of the attachment of the tenon to the workpiece. In the first place the said point M must lie in a plane coinciding with the front face 11 of the cutter 3. In the second place said point M must lie on the line of intersection of two planes A and B. Plane A passes through the two parallel axes 7 of stepwise revolution. Plane B is perpendicular to plane A, midway between and parallel to the axes 7. This point of intersection M can be seen as a guide point which is decisive for the good operation and easy adjustment of the tenoner, as will be elucidated further on.

On the support 9 is mounted a carriage 12, which carries the disk 6 with the milling cutter 3. This carriage is tiltable around a center line 13 passing through the said point of intersection M. The significance of this point of intersection M will now be explained with reference to a workpiece 14, represented in a number of figures, on which a tenon 15 has been produced.

Depending on the thickness d of the tenon 15 to be produced, the axis of rotation 16 of the cutter 3 (with diameter D) is placed in the disk 6 at a certain distance e from the axis 7 of stepwise revolution. This means that the distance between the axis of rotation 16 of the cutter 3 and the axis 7 is equal to $\frac{1}{2}(D+d)$, d being the thickness of the tenon 15. (see also FIG. 5).

Referring to FIGS. 6 and 7 in a front view and a side view respectively the cutter 3 is rotated by a shaft 17. The cutter is provided with a belt drive 18. The annular disk 6 is provided with a chain drive 19 with a brake motor 33, so that the disk rotates slowly through 360°. The shaft 17 with its bearing housing 34 is joined to the disk 6 by an arm 20. The bearing housing 34 with its shaft 17 is also attached to an adjusting nut 21 which operates in conjunction with a screwthreaded rod 22 and a lever 23 with slide block 24. This block moves along a track 25 in a plate 26, the angular position of which in respect of its support 35 and of the disk 6 is adjustable. The length of the track 25 with which the width b of the tenon 15 is adjustable is determined by sliding abutments 27. These are provided with a setting mechanism 36. (see also FIG. 8).

As the disk 6 rotates the block 24 first slides along the track 25 so that the cutter 3 can mill the flat part of the tenon 15. As soon as the block strikes an abutment 27, the shaft 17 with the cutter 3 passes through an arc of 180° in order to produce the rounded side of the tenon 15, as is clearly shown in several positions in relation to FIG. 5.

The block 24 then returns along the track 25 to the other abutment 27, whereby the cutter 3 mills the second flat face of the tenon 15. When it reaches the second abutment 27 the shaft 17 with the cutter 3 again revolves through 180° and the second rounded edge is produced. The block 24 again slides along the track 25 until the disk 6 has completed its full revolution. Said brake motor 33 then stops and the disk 6 is lowered along a guide 28 so that the cutter 3 (possibly with a saw blade 29) is entirely clear of the workpiece 14. This workpiece can then be removed with its carrier 2. As soon as it is replaced by a new workpiece the disk 6 is moved back and a new cycle of the disk 6 commences (see also FIGS. 6 and 7).

Figure 8:
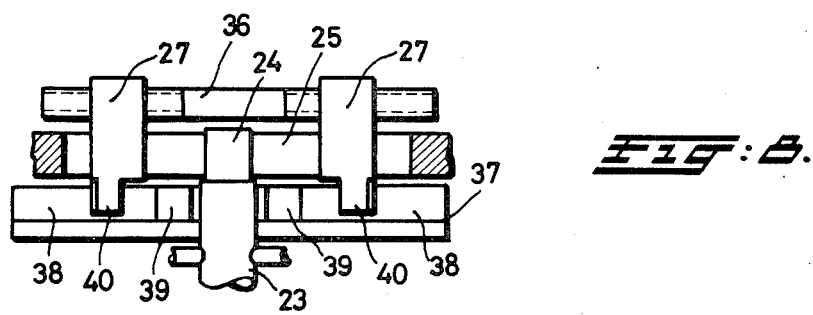
FIG. 8 is a partially sectional view of a detail.
Figure 9:
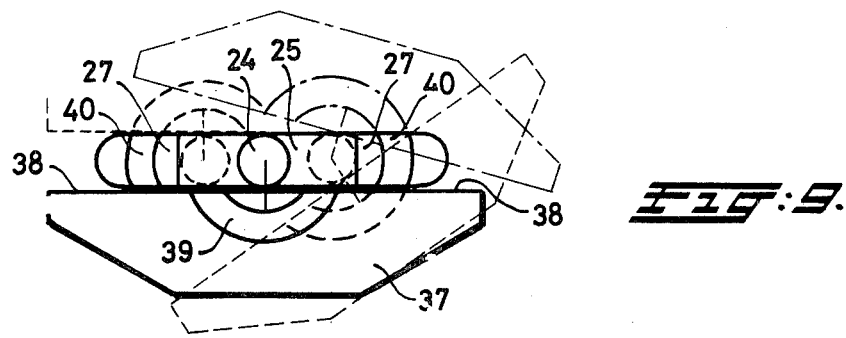
FIG. 9 is a diagram of the traveling path of an aligning plate for a slide block.

As can be seen in FIG. 5, the slide block 24, which may be in the form of a traveling roller, is in a relatively unstable state vis-à-vis the shaft 17. In order to prevent this, an aligning plate 37 provided with running surfaces 38 is attached to the support of the lever 23. These surfaces 38 cooperate with running cams 40 on the abutments 27. When the slide block 24 contacts an abutment 27 and the cutter is about to revolve, the relevant running cam 40 slides through a circular groove 39 in the aligning plate 37, so that the plate can turn with it. The various stages are shown in FIGS. 8 and 9.

The mechanism for this, which has been described with reference to FIGS. 5-9 is contained in the carriage 12. This carriage is housed in the support 9 in such a way that during the milling of the tenon 15 the aforementioned point of intersection M is always found to lie in the center or root of that tenon, to wit in the center of the part where the tenon is joined to the workpiece 14. Thus a change in the set angle in FIG. 1a will have no effect on the value of angle $\alpha$ in FIG. 3a.

Referring now to FIGS. 1b–d and 3b–d between each pair of supporting elements which are adjustable in respect of each other, viz. the support 9 in respect of the base 8 and the carriage 12 in respect of the support 9, there are scale marks, which provide a direct indication of the angular position ($\alpha$ and $\beta$) of each tenon 15 in respect of the workpiece 14. FIGS. 4a–c provide a view of the combined adjustment $\alpha+\beta$.

Referring now to FIG. 10 for each of the aforementioned possible settings a remote-controlled source of power 30 and 31 is present in combination with a control panel 32 provided with adjusting elements and visual indicators. Control mechanisms may also be present for setting the eccentricity of the milling cutter 3 in the annular disk 6 for controlling the thickness d of the tenon 15. The path of the slide block 24 can also be set on the control panel in order to determine the width b of each tenon 15. Thus the said control panel can be used to set and monitor the shape, place and angular position of the tenons 15 for each workpiece 14.

On the same side as the milling cutter 3 the carriage is provided with a rotating sealing plate 41. This plate comprises a radial eccentric slot 42 through which the shaft 17 protrudes. Freely rotating supporting rollers 44 for the sealing plate 41 are mounted on a mounting plate 43. The supporting rollers have circumferential groove into which a flange on the circumference of the sealing plate 41 fits, so that the plate is also locked in the axial direction. When the milling cutter 3 follows its path in the slot 42 the shaft 17 also presses against the side of the slot 42 and the plate 41 will therefore rotate. Thus the slot can have a length equal to one-half the length of the track 25. The disk 6 is preferably made of friction-resistant plastic with a low coefficient of friction.

What is claimed is:

1. A tenoner comprising a frame; at least one displaceable workpiece carrier in the frame; two supporting elements mounted in the frame at opposite ends of the workpiece carrier; a carriage mounted in each supporting element, each carriage being displaceable in two mutually perpendicular directions and tiltable around two mutually perpendicular axes for setting the relative location and angular position of a tenon; an adjustable milling cutter journaled upon each carriage; and means for periodically imparting to each cutter a stepwise revolving movement of 180° around an axis, the axis extending in a direction for causing the cutter to cut a rounded side of the tenon being milled.

2. An apparatus for milling tenons in a workpiece, comprising:
   (A) a frame;
   (B) a workpiece carrier for carrying a workpiece along a path through the frame;
   (C) a first cutter assembly mounted to the frame and disposed at a first side of the path for milling a first tenon in the workpiece; and
   (D) a second cutter assembly mounted to the frame and disposed at a second side of the path opposite the first side for milling a second tenon in the workpiece; each of the first and second cutter assemblies comprising:
      (1) a support assembly mounted on the frame, comprising a carriage tiltable in first and second directions around respective first and second axes and displaceable relative to the frame in two mutually perpendicular directions; and
      (2) a cutter mechanism for milling the tenon in the workpiece, the cutter mechanism being mounted on the carriage and being displaceable and tiltable therewith for setting the location and position of the tenon to be milled.

3. The apparatus of claim 2, further comprising remote control means for adjusting and monitoring the first and second cutter assemblies and for displacing and tilting the carriages for setting the locations, angular positions and shapes of the first and second tenons.

4. The apparatus of claim 2 in which each support assembly further comprises a base slidably mounted on the frame for displacing the carriage in two mutually perpendicular directions and a support mounted on the base and rotatable around the first axis for tilting the carriage in the first direction.

5. The apparatus of claim 4 in which the base and the support have scale marks for indicating the position of the tenon in the first direction.

6. The apparatus of claim 4 in which the carriage is mounted to the support and tiltable around the second axis for displacing the carriage in the second direction, the second axis being perpendicular to the first axis.

7. The apparatus of claim 6 in which the second axis intersects the first axis at a root point, the root point being located at the center of the cross-section of the tenon to be milled in the plane in which the tenon is joined to the workpiece.

8. The apparatus of claim 6 in which the carriage and the support have scale marks for indicating the position of the tenon in the second direction.

9. The apparatus of claim 6, further comprising remote control means for tilting the carriage and rotating the support.

10. The apparatus of claim 2 in which each cutter mechanism comprises a cutter for milling the workpiece, the cutter revolving around a cutter axis, the cutter having a front face disposed toward the workpiece to be milled; the cutter mechanism further comprising means for moving the cutter for cutting around the sides of the tenon to be milled, the moving means moving the front face of the cutter for milling a flat surface perpendicular to the cutter axis, the flat surface defining a base plane in which the tenon to be milled is joined to the workpiece.

11. The apparatus of claim 10 in which the second axis intersects the first axis at a root point located at the center of the cross-section of the tenon to be milled in the base plane.

12. The apparatus of claim 11 in which the moving means moves the cutter through a first semicircle around a third axis for milling a first end of the tenon to be milled and through a second semicircle around a fourth axis parallel to the third axis for milling a second end of the tenon, the third and fourth axes being located such that the root point lies on the line of intersection of a first plane through the third and fourth axes with a second plane parallel to and midway between the third and fourth axes.

13. The apparatus of claim 12 in which the cutter rotates about a cutter axis, the cutter mechanism further comprising means for adjusting the distance between the cutter axis and each of the third and fourth axes for setting the thickness of the tenon to be milled.

14. The apparatus of claim 12 in which the cutter mechanism further comprises sliding means connected to the shaft for permitting the moving means to move the cutter between a first position at the completion of the first semicircle to a second position at the beginning of the second semicircle and between a third position at the completion of the second semicircle to a fourth position at the beginning of the first semicircle.

15. The apparatus of claim 14 in which the sliding means comprises an adjustable plate having a track and a slide block slidably mounted on the track, the slide block being connected for moving as the cutter moves between the first and second positions and between the third and fourth positions.

16. The apparatus of claim 15 in which the sliding means further comprises sliding abutments mounted in the track for stopping the slide block when the cutter reaches the second and fourth positions, the sliding abutments defining the length of the track and being adjustable for setting the width between the first and second ends of the tenon to be milled.

17. The apparatus of claim 16 in which the cutter mechanism further comprises a shaft connected to and movable with the cutter for rotating the cutter and aligning means for maintaining a stable relation between the shaft and the slide block.

18. The apparatus of claim 17 in which the aligning means comprises an aligning plate connected for moving with the slide block and the shaft and for turning pivotally around the slide block when the moving means is moving the cutter in the first and second semicircles, the aligning plate having circular grooves for permitting the sliding abutments to slide through the aligning plate when the plate turns pivotally around the slide block.

19. The apparatus of claim 10 in which the cutter mechanism further comprises a shaft connected to and movable with the cutter for rotating the cutter and a rotatable sealing plate mounted to the carriage and having a slot, the shaft passing through the slot and causing the sealing plate to rotate as the moving means moves the cutter.

20. A tenoner comprising:
a frame;
a displaceable workpiece carrier in the frame;
two supports mounted to the frame at opposite ends of the workpiece carrier; each support comprising a supporting element and a carriage mounted on the supporting element and displaceable in two mutually perpendicular directions and tiltable around two mutually perpendicular axes for setting the relative location and angular position of a tenon being milled; and
two adjustable milling cutters, each including a drive and each journaled upon a respective one of the carriages for periodic stepwise revolving movement of 180° around a respective axis, each axis extending in a direction for causing the respective cutter to cut a rounded side of the tenon being milled.

* * * * *